US007986883B2

(12) United States Patent
Reilly et al.

(10) Patent No.: US 7,986,883 B2
(45) Date of Patent: Jul. 26, 2011

(54) SOLAR BLIND ULTRAVIOLET COMMUNICATION SYSTEM FOR UNATTENDED GROUND SENSOR NETWORK

(75) Inventors: David M. Reilly, Boxborough, MA (US); Daniel T. Moriarty, Hollis, NH (US); Warren L. Clark, Billerica, MA (US); John A. Maynard, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/630,656

(22) PCT Filed: Oct. 25, 2005

(86) PCT No.: PCT/US2005/038560
§ 371 (c)(1),
(2), (4) Date: Dec. 22, 2006

(87) PCT Pub. No.: WO2006/137921
PCT Pub. Date: Dec. 28, 2006

(65) Prior Publication Data
US 2007/0253713 A1    Nov. 1, 2007

Related U.S. Application Data

(60) Provisional application No. 60/621,766, filed on Oct. 25, 2004.

(51) Int. Cl.
*H04B 10/00* (2006.01)
(52) U.S. Cl. .................. 398/118; 398/130; 398/125

(58) Field of Classification Search ........... 398/118–131
See application file for complete search history.

(56) References Cited

U.S. PATENT DOCUMENTS

| 3,443,095 | A | * | 5/1969 | Frungel .................. 250/372 |
| 4,079,246 | A | * | 3/1978 | Misek .................... 398/161 |
| 4,493,114 | A | * | 1/1985 | Geller et al. ............ 398/119 |
| 4,829,597 | A | * | 5/1989 | Gelbwachs ............... 398/104 |
| 4,908,626 | A | * | 3/1990 | Loucks ................... 342/60 |
| 5,038,406 | A | * | 8/1991 | Titterton et al. ........ 398/125 |
| 5,062,154 | A | * | 10/1991 | Geller et al. ........... 398/130 |
| 5,191,460 | A | * | 3/1993 | Lapatovich ............. 398/201 |
| 5,301,051 | A | * | 4/1994 | Geller ................... 398/118 |
| 5,307,194 | A | * | 4/1994 | Hatton et al. .......... 398/130 |
| 5,371,502 | A | * | 12/1994 | Dittmann ............... 342/68 |
| 5,489,909 | A | * | 2/1996 | Dittmann et al. ....... 342/68 |

(Continued)

OTHER PUBLICATIONS

Larry B. Stotts and D. D. Bryski; "Unattended ground sensor related technologies; an Army perspective"; *Proc. SPIE* vol. 4743 (2002).

(Continued)

*Primary Examiner* — Agustin Bello
(74) *Attorney, Agent, or Firm* — Daniel J. Long (57) ABSTRACT

The systems and methods described herein allow a user to communicate using a ground sensor network that is capable of both line-of-sight (LOS) and non-line-of-sight (NLOS) communication. In particular, the systems and methods herein described transmit and receive ultraviolet radiation having a wavelength within the solar blind region from a plurality of sensing nodes arranged both in a LOS network, which communicates via LOS communication, and in a NLOS network, which communicates via NLOS communication. The ultraviolet radiation is then transmitted from the plurality of sensing nodes to a remote receiver, via LOS communication.

41 Claims, 8 Drawing Sheets

EXHIBIT A

U.S. PATENT DOCUMENTS

| | | | | |
|---|---|---|---|---|
| 5,719,567 A * | 2/1998 | Norris | | 340/953 |
| 6,137,609 A * | 10/2000 | Scheps | | 398/125 |
| 6,674,082 B1 * | 1/2004 | Gunn | | 250/363.01 |
| 7,606,496 B1 * | 10/2009 | Mitchell | | 398/125 |
| 7,805,079 B1 * | 9/2010 | Meyers et al. | | 398/118 |
| 2007/0253713 A1 * | 11/2007 | Reilly et al. | | 398/96 |

OTHER PUBLICATIONS

Gary A. Shaw, et al.; "NLOS UV Communication for Distributed Sensor Systems"; *Proc. SPIE* vol. 4126 (2000).

Barry Charles, et al.; "An ultraviolet laser based communications system for short range tactical applications"; *SPIE* vol. 2115, *Visible and Ultraviolet Lasers* (1994).

Jeffery J. Puschell et al.; "High Data Rate Ultraviolet Communication System for the Tactical Battlefield"; *Proc. Of the Tactical Communications Conference, vol. 1 Tactical Communications. Challenges of the 1990's* (1990).

Frederick Martin; "Ultraviolet Light Fosters Covert Special Operations"; *Signal*, May 1990.

Gary A. Shaw, A. M. Siegel and M. Nischan; "Demonstration System and Applications for Compact Wireless Ultraviolet Communications"; *Proc. SPIE* vol. 5071 (2003).

W. H. Sun, et al.; "AlGaN-based 280nm light-emitting diodes with continuous wave powers in excess of 105 mW"; *Applied Physics Letters*, Jul. 26, 2004.

V. Adivarahan, et al.; "250 nm AlGaN light-emitting diodes"; *Applied Physics Letters*, vol. 85, No. 12: Sep. 20, 2004.

R. D. Hudson; "Critical Review of Ultraviolet Photoabsorption Cross Sections for Molecules of Astrophysical and Aeronomical Interest"; *Reviews of Geophysics and Space Physics*; vol. 9, No. 2, May 1971.

Mark R. Luettgen, Jeffrey H. Shapiro and David M. Reilly; "Non line-of-sight single-scatter propagation model"; *J. Opt. Soc. Am A*, vol. 8, No. 12, Dec. 1991.

* cited by examiner

EXHIBIT A

Drawings

Prior art

Prior art

Figure 6.

Prior art

| Type | Bit Rate | Pulse Rate | Ppk (mW) | Eb (nJ) |
|---|---|---|---|---|
| RZ-OOK | 20 k | 10 k | 12.0 | 150 |
| 4PPM | 20 k | 10 k | 12.0 | 150 |
| 16PPM | 20 k | 5 k | 24.0 | 300 |
| Pave=1.5 mW, t_pulse=12.5 usec | | | | |

SOLAR BLIND ULTRAVIOLET COMMUNICATION SYSTEM FOR UNATTENDED GROUND SENSOR NETWORK

CROSS REFERENCE TO RELATED APPLICATION

This application claims rights under 35 USC 119(e) from U.S. Patent Application Ser. No. 60/621,766, filed Oct. 25, 2004.

STATEMENT OF GOVERNMENT INTEREST

This invention was made with U.S. Government support under Contract No. DAAD19-01-C-0068 with the U.S. Army Research Laboratory, and the U.S. Government has certain rights in the invention.

BACKGROUND OF THE INVENTION

1. Field of Invention

The present invention relates to unattended ground sensor systems and, more particularly, to the use of solar blind ultraviolet communication systems therein.

2. Brief Description of Prior Developments

The primary functions associated with unattended ground sensor (UGS) networks are sensing, processing and communicating. While the sensing elements are the basis for the network, the value of the network is associated with the synergism of multiple sensors (distributed sensing) contributing to the generation of a surveillance picture which is much larger and of higher fidelity than can be provided by any single sensor. Therefore, overall network requirements ultimately drive those associated with individual functions (sensing, processing and communicating). The evolving role of unattended ground sensors for military applications was reported in some detail in L. B. Stotts and D. D. Bryski; "Unattended ground sensor related technologies; an Army perspective"; *Proc. SPIE* Vol. 4743 (2002), the contents of which are incorporated herein by reference.

Communication system requirements will vary considerably from network to network. In general, a network communication system includes the means to communicate among sensing nodes and/or a gateway node, and a means of communication between the gateway node and an external terminal.

SUMMARY OF INVENTION

The present invention comprises a wireless inter-nodal communication system which operates in the solar blind ultraviolet (200 nm-280 nm) and is capable of providing covert non line-of-sight operation. The present invention also encompasses a method for providing inter-nodal communications in an unattended ground sensor network comprising the steps of making use of line-of-sight ultra-violet radiation with a wavelength within the solar blind region, and in appropriate situations preferably employing wide field-of-view receivers and large transmitter cone angles.

Solar blind ultraviolet communication systems can provide short to medium range non line-of-sight and line-of-sight links which are covert and insensitive to meteorological conditions. Operation in the solar blind region provides zero background conditions and strong scattering interactions. Scattering provides the basis for transferring information when non line-of-sight conditions exist. Zero background conditions are a result of strong absorption of solar radiation in the upper atmosphere. These conditions make it possible to operate very sensitive wide field-of-view quantum noise limited photon counting receivers, and provide communication systems that perform very differently than free space optical systems that operate in other spectral regions. These systems may be compact and require very low primary power for operation.

Non line-of-sight ultraviolet communication systems can provide reliable inter-nodal communications for unattended ground sensor networks. This type of system is particularly attractive when non line-of-sight conditions exist between nodes, covert operation is required, and insensitivity to positioning and ground proximity are desired. Light emitting diode technology being developed under the DARPA SUVOS program represents an enabling technology for these systems. Small, low power and low cost systems compatible with unattended ground sensor networks will be available as a result of this program. Data rates of hundreds of kbps with bit error rates (BER) of $10^{-7}$ and inter-nodal ranges of hundreds of meters are consistent with phenomenology and technology.

Line-of-sight ultraviolet communications systems also offer some unique characteristics for exfiltration of data from an unattended ground sensor network. The absence of background radiation makes it possible to operate with wide field-of-view receivers and large transmitter cone angles. This capability significantly reduces acquisition/pointing/tracking requirements that are traditionally associated with free space optical links. In addition, strong forward aerosol scatter in the ultraviolet reduces dependence on meteorological conditions. The operational range of line-of-sight solar blind communication systems is on the order of kilometers. By selection of operating wavelength within the solar blind region, performance can be optimized to provide reliable communications and at the same time provide covert operation. Data rates on the order of megabits per second are possible with line-of-sight systems.

BRIEF DESCRIPTION OF THE DRAWINGS

The present invention is further described with reference to the accompanying drawings wherein:

FIGS. 5(a), (b), and (c) are each schematic drawings of preferred embodiments of non line-of-sight system configurations of the present invention;

DETAILED DESCRIPTION OF THE PREFERRED EMBODIMENT

1. Solar Blind Ultraviolet Communications

Figure 1:
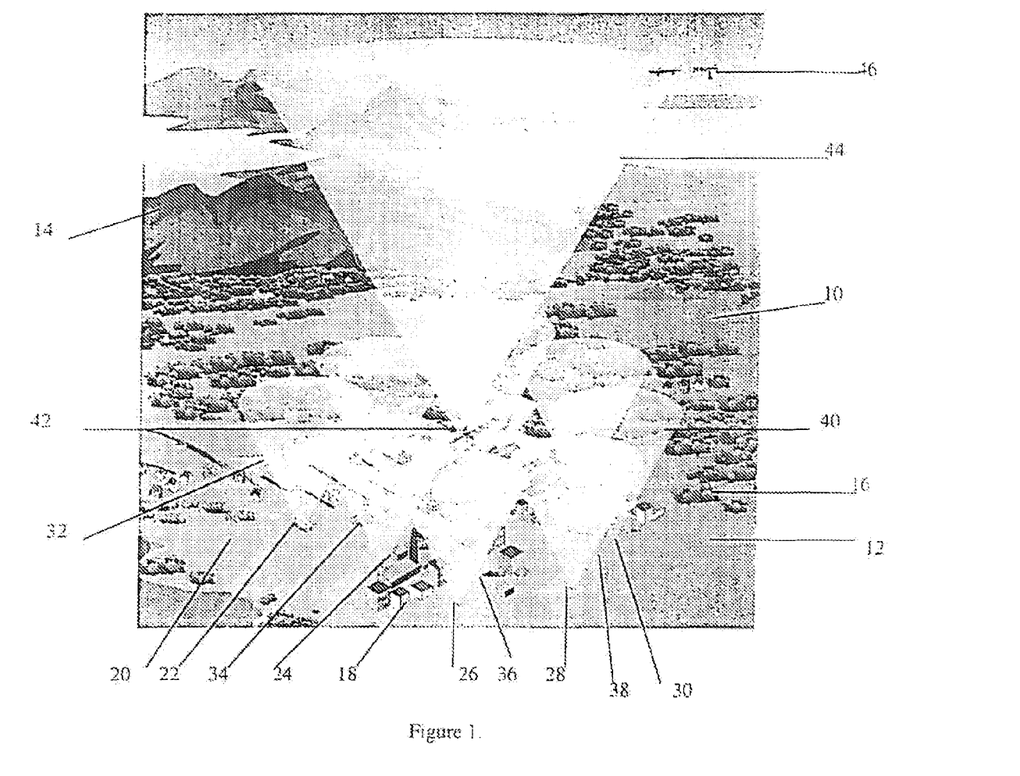
FIG. 1 is a perspective drawing showing a communication system (inter-nodal and gateway) for ground-based unattended sensor network.

Communications is a key element of unattended sensor networks. Communication systems are required for inter-nodal communication and for transmission of information from a gateway to a higher level system. There are a number of communication system approaches under consideration for unattended ground sensors as is disclosed in Gary A. Shaw, et al.; "NLOS UV Communication for Distributed Sensor Systems"; *Proc. SPIE* Vol 4126 (2000), the contents of which are incorporated herein by reference. Each system offers advantages and disadvantages and must be considered with respect to specific network requirements. For those applications where non line-of-sight conditions do or may exist, covert operation is required, and insensitivity to transceiver orientation is important, a non line-of-sight solar blind ultraviolet communication network may represent an optimum solution. These communication systems may be located at fixed ground sites as shown in FIG. 1 or they may be utilized with mobile (ground-based or airborne) networks. System requirements will vary considerably depending on network type and associated sensor technology.

Referring to FIG. 1, a preferred embodiment of the sensor network of the present invention is used on terrain which is shown generally at 10 which has a planer area 12 and remote terrain features as mountains 14. This terrain 10 is also characterized by vegetation as at trees 16 and obscuring features as at building 18. The network shown generally at numeral 20 includes a plurality of unattended sensing nodes as at nodes 22, 24, 26, 28 and 30. Each of these nodes includes a transmitter for transmitting ultra-violet radiation with a wavelength within the solar blind region and a receiver for receiving ultra-violet radiation with a wavelength within the solar blind region. Ultra-violet radiation is transmitted in a cone angle of the receiver as at cones 32, 34, 36, 38, and 40. There is also a gateway node 42 with a cone angle of transceiver 44 which transmits ultra-violet radiation with a wavelength within the solar blind region to remote receiver 46 which may, for example, be positioned in an unmanned aerial vehicle (UAV).

Figure 2:
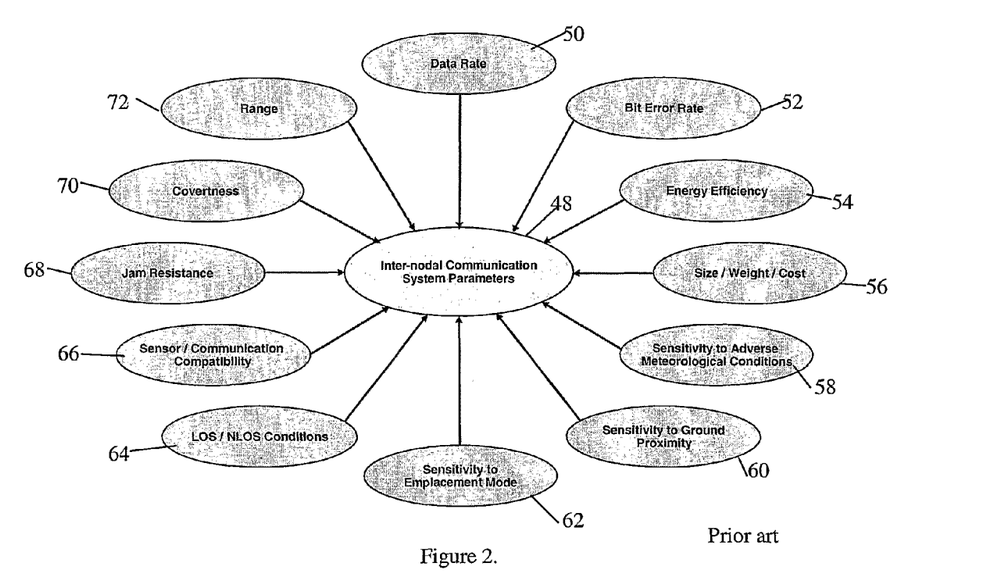
FIG. 2 is a prior art schematic drawing showing a general inter-nodal communication system parameters.

General inter-nodal communication system parameters are shown in FIG. 2. While the ability to reliably transmit selected information over inter-nodal distances is clearly the primary requirement for any communication system, many other requirements will ultimately determine which systems approach represents an optimum solution for a given network. For unattended ground sensor (UGS) networks, low power operation, covertness and cost are major considerations.

Referring to FIG. 2, it will be understood that inter-nodal communication system parameters 48 include the following: data rate 50, bit error rate, 53, energy efficiency 54, size/weight/cost 56, sensitivity to adverse meteorological conditions 58, sensitivity to ground proximity 60, sensitivity to emplacement mode 62, LOS/NLOS condition 64, sensor/communication capability 66, jam resistance 68, covertness 70, and range 72.

Figure 3:
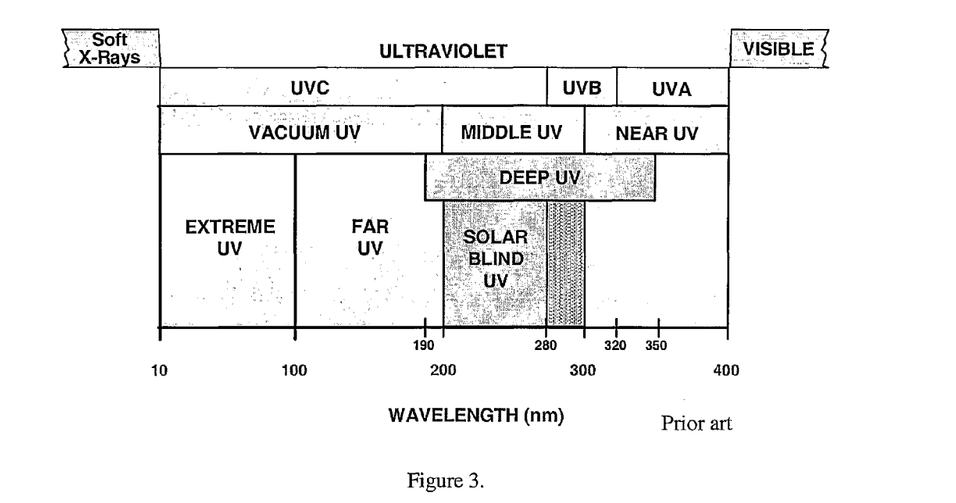
FIG. 3 is a prior art chart showing the ultraviolet spectral region.

Referring to FIG. 3, the ultraviolet spectrum is divided into several regions as is disclosed in R. E. Huffman; *Atmospheric Ultraviolet Remote Sensing*; Chapter 2; Academic Press, 1992 the contents of which are incorporated herein by reference. The region between 200 nm and 280 nm is referred to as the solar blind region. In this region, radiation interacts strongly with atmospheric constituents (molecules and aerosols) resulting in some very unique properties. At wavelengths greater than 280 nm, background radiation is significant and constraints associated with most optical systems apply. Below 200 nm, absorption is so strong that propagation is severely limited and it is not feasible to operate within the atmosphere. The unique properties and the potential value of solar blind ultraviolet communication systems have been recognized for many years. A number of prototypes have been built and tested as disclosed in M. Geller and G. B. Johnson; "Non Line-of-Sight (NLOS) Covert UV Communication Link"; *Proc.* 1985 *IEEE Military Communications Conference*, Boston, Mass., October 1985: 4, 95; B. Charles, B. et. al.; "An ultraviolet laser based communications system for short range tactical applications"; *SPIE* Vol. 2115, *Visible and Ultraviolet Lasers* (1994); J. J. Puschell; "High Data Rate Ultraviolet Communication System for the Tactical Battlefield"; *Proc. Of the Tactical Communications Conference, Vol I Tactical Communications. Challenges of the* 1990's (1990); F. Martin; "Ultraviolet Light Fosters Covert Special Operations"; *Signal*, May 1990; G. A. Shaw, A. M. Siegel and M. Nischan; "Demonstration System and Applications for Compact Wireless Ultraviolet Communications"; *Proc. SPIE* Vol. 5071 (2003), the contents of all of which are incorporated herein by reference. While the potential was recognized, propagation models and prototype systems developed and validated, no viable applications emerged due to emitter limitations. In general, available emitter characteristics (size, power consumption and cost) were inconsistent with potential applications. This situation is changing rapidly as semiconductor emitters (LEDs and Lasers) being developed under the DARPA SUVOS (Semiconductor Ultraviolet Optical Sources) Program begin to emerge as is disclosed in http://www.darpa.mil/mto/suvos/; W. H. Sun, et. al.; "AlGaN-based 280 nm light-emitting diodes with continuous wave powers in excess of 105 mW"; *Applied Physics Letters,* 26 Jul. 2004; V. Adivarahan, et al.; "250 nm AlGaN light-emitting diodes"; *Applied Physics Letters*, Vol. 85, No. 12: 20 Sept. 2004 the contents of which are incorporated herein by reference. With the availability of these emitters, solar blind ultraviolet communication systems are poised to satisfy inter-nodal communication requirements for unattended ground sensors. This is especially true for those applications where non line-of-sight conditions do or may exist, covert operation is required and insensitivity to sensor positioning is highly desirable.

Figure 4:
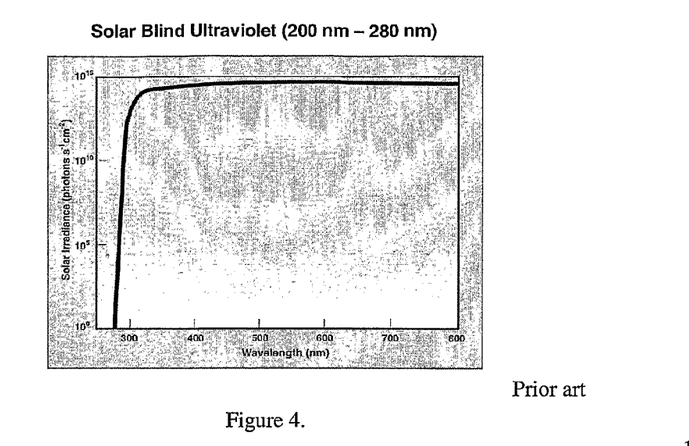
FIG. 4 is a prior art graph showing solar irradiance in the lower atmosphere.

1.1 Unique Properties:

The unique properties of the solar blind region are a result of strong interactions in the upper and lower atmospheres. In the upper atmosphere, the ozone layer (nominally 20 km altitude) strongly absorbs solar radiation producing what is referred to as zero background conditions in the lower atmosphere. These conditions are the reason why this region is referred to as the solar blind region. Ground level solar irradiance as a function of wavelength is shown in FIG. 4. The sharp transition in background level from 300 nm to 280 nm is due to ozone absorption. In the lower atmosphere, molecules and aerosols present in the medium (communication channel) strongly scatter and absorb radiation. Scattered radiation provides a basis for non line-of-sight communication and absorption provides the basis for covert operation.

The absence of background radiation (zero background conditions) makes it possible to design receivers with very unique properties. For most optical systems, background radiation limits performance and leads to narrow field-of-view receivers with significant acquisition/pointing/tracking requirements, and a strong dependence on meteorological conditions. In the solar blind ultraviolet, the opposite is true. Sensitive (quantum noise limited) photon counting wide field-of-view receivers are possible, and pointing requirements and dependence on meteorological conditions are minimal.

While zero background conditions makes it possible to operate very sensitive wide field-of-view receivers, it is strong scattering that provides the means of transferring information from a transmitter to a receiver when non line-of-sight conditions exist. Scattering provides an indirect path from transmitter to receiver and involves the volume in which the communication system is immersed. This mode of operation may be thought of as a large number of tiny relay stations located in the transmitter/receiver common volume where each station is located at a different point in space and each signal arrives at the receiver at a slightly different time. The volume in space that contributes to the temporal distribution of the received signal is determined by the communication system configuration. Three different configurations are shown in FIGS. 5(a), 5(b), and 5(c).

Figure 5:
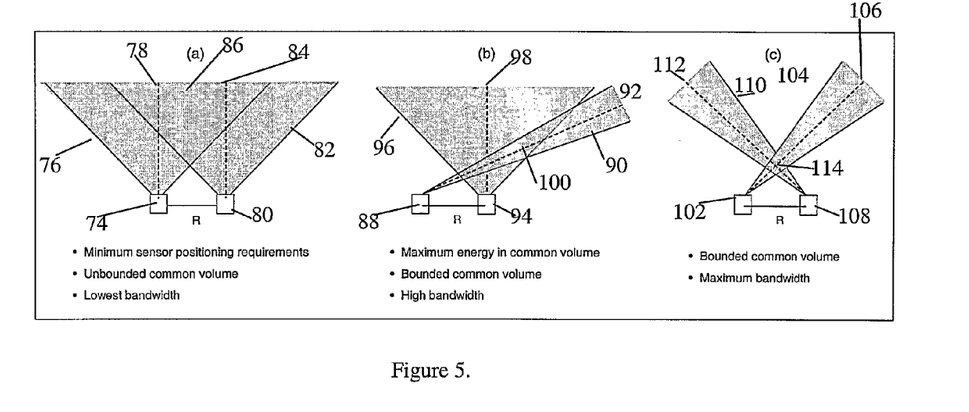

Referring, for example to FIG. 5(a) the transmitter in node 74 transmits ultra-violet radiation at a wavelength within the solar blind region in a wide angle cone 76 with longitudinal axis 78. Node 74 is separated from another node 80 by a distance R and the receiver receives ultra-violet radiation in at a wavelength within the solar blind region in a wide angle cone 82 with a vertical longitudinal axis 84. The cones 76 and 82 intersect in common volume 86. It will be appreciated that this arrangement has minimum sensor positioning requirements, and unbounded common volume, and the lowest band width as compared to the other arrangements shown in FIGS. 5(b) and 5(c). Referring to FIG. 5(b) there is a node 88 with a transmitter that transmits ultra-violet radiation at a wavelength within the solar blind region in narrow angle cone 90 that has a diagonal longitudinal axis 92. Node 88 is separated from node 94 by a distance R. Node 94 has a receiver which receives ultra-violet radiation at a wavelength within the solar blind region in a wide angle cone 96 with a vertical longitudinal axis 98. Cone 90 and cone 96 intersect in common volume 100. It will be appreciated that in this arrangement there is maximum energy in the common volume 100, a bounded common volume, and high bandwidth. Referring to FIG. 5(c), an arrangement is shown with node 102 with a transmitter that transmits ultra-violet radiation at a wavelength within the solar blind region in a narrow angle cone 104 which has a diagonal central axis 106. Node 108 is spaced from node 102 by distance R and also has a receiver that receives ultra-violet radiation at a wavelength within the solar blind region in a narrow angle cone with a central axis 112 and which intersects cone 104 in common volume 114. This arrangement results in a bounded common volume and maximum bandwidth. The temporal distribution (temporal dispersion) of the received signal is determined by transmitter/receiver common volume. For a given system configuration (transmitter cone angle and receiver field-of-view) the width of the temporal distribution broadens with range and the bandwidth of the channel decreases. The magnitude of the received signal is determined by common volume, photon density incident on the volume and characteristics (number density, size distribution and phase function) of scattering particles within the volume. For the purposes of this disclosure, a wide angle cone is considered to have an angle of between about 90° to about 180°, and a narrow angle cone is considered to have an angle of about 30° or less.

Figure 6:
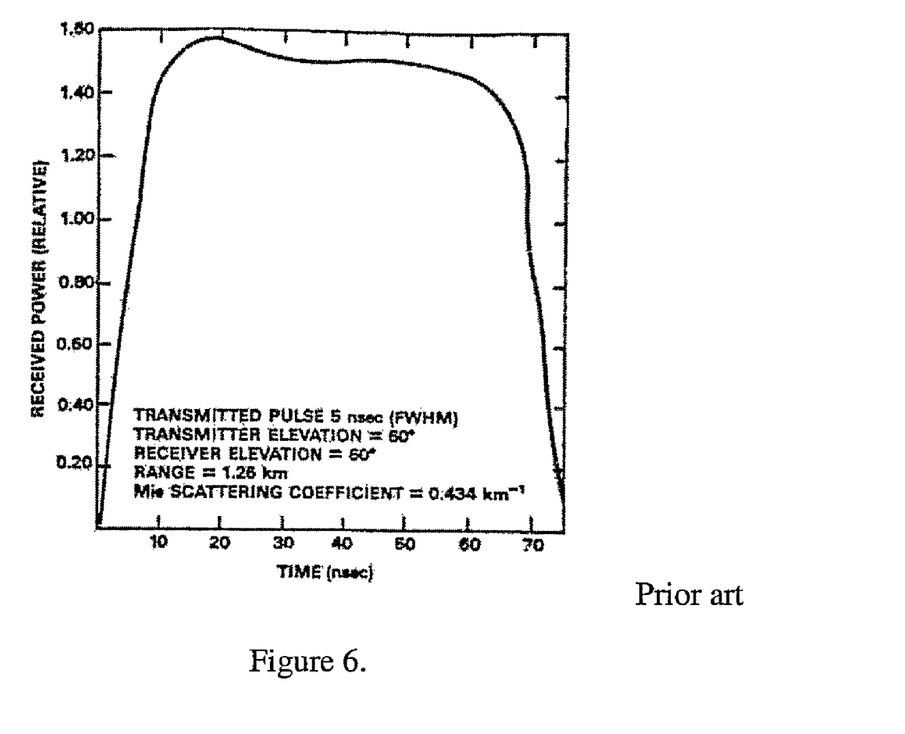
FIG. 6 is a prior art graph showing channel impulse response (R=1.26 km) in the possible operation of a preferred embodiment of the system of the present invention.

1.2 Communication Channel Capacity:

The capacity (maximum data rate) of the communication system is determined by the temporal distribution of the received signal. This distribution (summation of a large number of multi-path signals) represents the channel impulse response and is, as mentioned above, determined by transmitter/receiver common volume characteristics. Where the common volume is bounded and relatively small as shown in FIG. 5c, the impulse response will be less than 100 ns and the channel capacity will be on the order of mbps. An experimental example of the temporal distribution for this case is shown in FIG. 6 as described in F. Martin; "Ultraviolet Light Fosters Covert Special Operations"; Signal, May 1990, the contents of which are incorporated herein by reference. Here the range was 1.2 km, transmitted pulse width was 5 ns and the measured impulse response was 70 ns. Impulse response duration will depend on inter-nodal separation, transmitter and receiver elevation angles, transmitter divergence and receiver field-of-view. Where the volume is unbounded (FIG. 5a), the impulse response will be on the order of a 1000 ns and channel capacity will be on the order of hundreds of kbps. Therefore, data rates from hundreds of kbps to several mbps are feasible for non line-of-sight ultraviolet communication systems.

Figure 7:
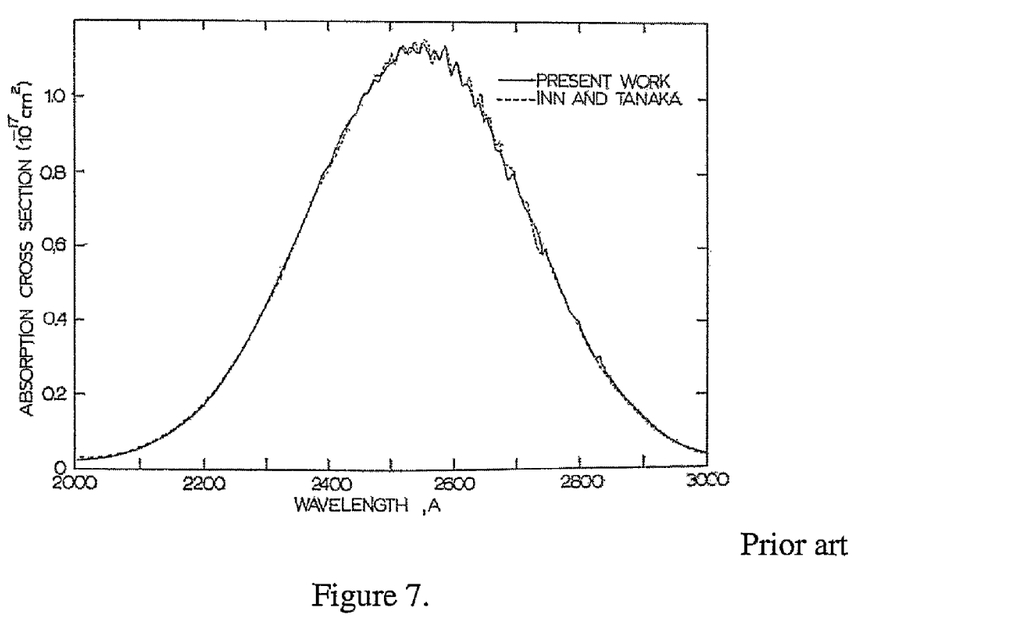
FIG. 7 is a prior art graph showing ozone absorption cross-section in the possible operation of a preferred embodiment of the system of the present invention.

1.3 Covertness:

Covertness (low probability of detection or intercept) is an important system parameter for unattended ground sensors. For solar blind ultraviolet communication systems, atmospheric absorption provides the basis for covertness. Covertness is primarily due to absorption by ambient ozone ($O_3$) and molecular oxygen ($O_2$) and secondarily, to system configuration/geometry. The degree of covertness is a strong function of wavelength and is a factor in system design considerations. As wavelength decreases, covertness increases. For wavelengths between 230 nm and 280 nm, ozone is the dominant absorber. Below 230 nm, molecular oxygen determines the degree of covertness. Since ozone is a variable atmospheric component and density can vary significantly, this fact must be reflected in system design. Typical numbers will range between 25 ppb and 75 ppb (parts per billion). The absorption cross-section of ozone is shown in FIG. 7 as disclosed in R. D. Hudson; "Critical Review of Ultraviolet Photoabsorption Cross Sections for Molecules of Astrophysical and Aeronomical Interest"; *Reviews of Geophysics aid Space Physics*; Vol. 9, No. 2, May 1971, the contents of which are incorporated herein by reference. It is truly a strong absorber with peak absorption at 255 nm. Transmission of ozone as a function of wavelength, concentration and range is described by Equation 1. Oxygen is also a strong absorber. However, it is a stable atmospheric component and operation in the oxygen region may be desirable for some applications. It should be noted that the mechanism responsible for covertness (absorption) also provides enhanced jam resistance and minimizes communication network susceptibility to interference from random ultraviolet sources and adjacent networks.

$$T(\lambda, R, O_3(\text{ppb})) = e^{-[\sigma(\lambda)] [O_3(\text{ppb})/10^9] N_0 R} \quad (1)$$

where $\sigma(\lambda)$: ozone absorption cross-section (cm$^3$)

$O_3$(ppb): ozone concentration in parts per billion $N_0$: $2.69 \times 10^{19}$ (molecules cm$^{-3}$)

$R$: range (cm)

1.4 Communication Transceiver Attitude and Ground Proximity:

Unattended ground sensors may be emplaced in a number of ways. In general it is highly desirable to minimize any systems requirements associated with communication system attitude and ground proximity. Due to the use of wide field-of-view receivers and the means used to transfer information (scattering from particles in the medium in which the system is immersed), solar blind ultraviolet non line-of-sight systems are relatively insensitive to pointing requirements and are not sensitive to ground proximity as is the case with RF systems.

1.5 Operational and Meteorological Conditions:

Unattended ground sensor networks must be capable of reliable performance over a wide range of operational and meteorological conditions. The variations in operational and meteorological conditions are a result of variations in the number density and size distribution of particles (aerosols) in the atmosphere. While the significant variations that can occur severely limit most optical systems, non line-of-sight solar blind systems are relatively insensitive to these variations. This property is due to the fact that as meteorological or operational conditions degrade (visual range decreases), the number of scattering centers in the atmosphere increases. This effect leads to an increase in the magnitude of the received signal for a wide range of conditions.

1.6 Low Power Operation:

Low power operation is another important parameter for unattended ground sensor communication systems. In general, energy utilized by a communication system is determined by the energy required to transmit and receive information, and the transmit/receive duty cycle. Energy utilized to transmit information is a strong function of source efficiency and modulation technique employed to encode information. For solar blind communication systems where background noise is zero, internal receiver noise is very low and photon counting techniques are employed, transmit energy may be minimized by utilizing higher order digital communication techniques (e.g. M-ary PPM) to minimize the transmit pulse rate for a given information data rate. For such systems energy/pulse determines system performance characteristics. Ideally, the transmit pulse would be an impulse and the bit interval would be determined by the impulse response of the channel. This is a unique property of solar blind communication systems and quite different from pulse communication systems which are receiver or background noise limited.

2. Non Line-Of-Sight Communication System

Light emitting diodes (LEDs) emerging from the SUVOS (Semiconductor Ultraviolet Optical Sources) program represent enabling technology for tactically viable short range non line-of-sight communication systems that operate in the solar blind spectral region. These devices make it possible to take advantage of the unique properties of the solar blind ultraviolet for unattended ground sensor communications applications. Solar blind ultraviolet communication systems are particularly well suited for those applications where non line-of-sight conditions may exist between network nodes, covert operation is required and in-sensitivity to ground proximity and communication system attitude are highly desirable. In this section a specific system configuration will be considered and trade-offs based on LED performance characteristics will be presented. The characteristics of the system are presented in FIG. 8.

Figure 8:
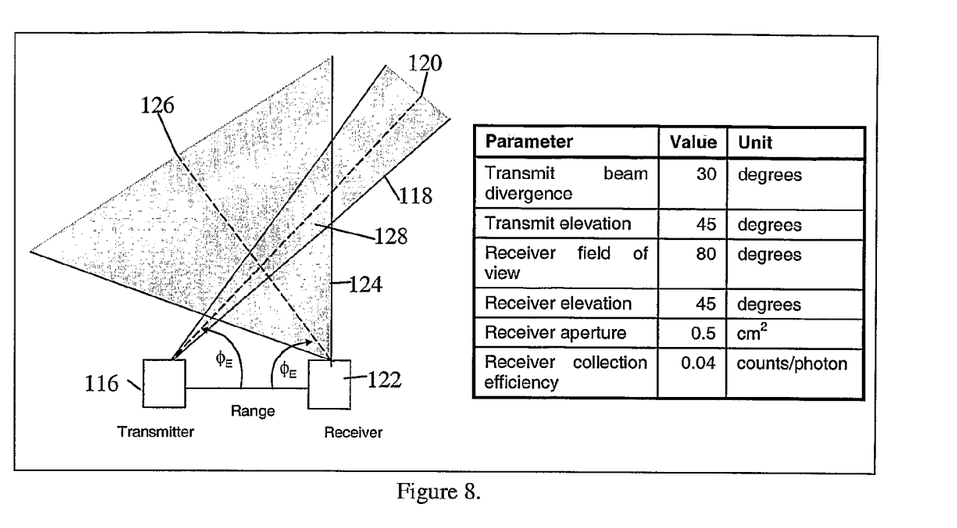
FIG. 8 is a schematic drawing showing a preferred embodiment non line-of-sight communication system of the present invention.

Referring to FIG. 8, there is a transmitter 116 with its associated cone 118 which has a diagonal longitudinal axis 120. Receiver 122 has an associated cone 124 and a longitudinal axis 126. Cones 118 and 124 intersect in common area 128.

The UV non line-of-sight communication channel transfers information from the transmitter to the receiver by scattering from particles in the atmosphere as discussed in previous sections. This scattering process is lossy and introduces pulse broadening due to multi-path effects. The magnitude of these effects depends on the system configuration. However, system dependencies (range, meteorological conditions, etc.) are desirable and the ability (zero background conditions) to utilize sensitive photon counting receivers makes it possible to employ transmitters based on low energy sources such as LEDs to achieve low power operation consistent with unattended ground sensor requirements.

Figure 9:
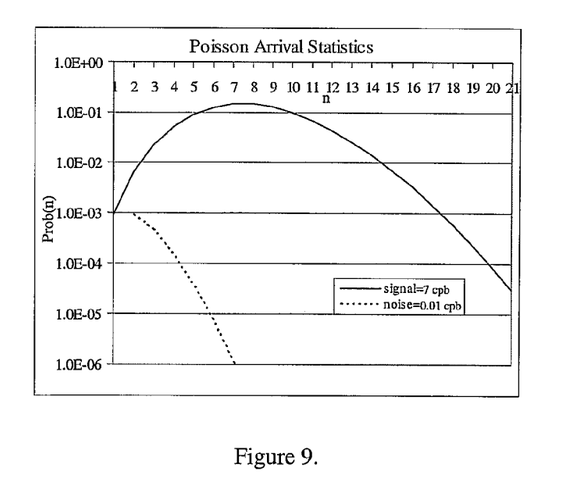
FIG. 9 is a graph showing poisson arrival statistics for an average signal rate of 7 counts per bit and an average noise rate of 0.01 counts per bit for a preferred embodiment of a non line-of sight communication system of the present invention.

2.1 Photon Counting:

Zero background conditions and very low receiver dark noise characteristics make it possible to utilize photon counting receivers. This type receiver provides high sensitivity and stability. The receiver will be operating in the quantum noise limited regime where shot noise associated with the signal establishes system performance limits. Transmitted photons arrive at the receiver and are counted with some efficiency. Poisson statistics describe the counting process and are utilized to calculate probability of detection and bit error rates. The plots presented in FIG. 9 show the probability of detection for signal and noise. These curves provide the basis for determining system bit error rates once the modulation scheme is selected. In addition, they ultimately provide the basis for determining transmitter energy/pulse requirements.

FIG. 9 shows Poisson arrival statistics for an average received signal level of 7 counts per bit and an average noise level of 0.01 counts per bit, corresponding to a dark noise rate of 200 counts per second when the bit time is 50 µs. By defining a logic one as one or more received photons and a logic zero as no received counts, statistically there will be 1 error out of 1000 bits due to the receiver counting zero counts even though a logic one was transmitted. There also will be approximately 1 error out of 1000 bits due to a transmitted logic zero (no photons transmitted) being received as a logic one due to dark noise counts.

Using forward error correction (FEC), a channel error rate of 1e-3 can be corrected to better than 1e-7 with readily available Reed-Solomon techniques that only require a few percent increase in transmission rate to accommodate the necessary redundancy and framing overhead. With a data rate of 20 kbps, a 1e-7 BER is sufficiently error free to provide reliable service. Given the system requirements on received signal levels—7 counted photons per bit on average—the transmitter requirements follow from an analysis of the channel loss.

Figure 10:
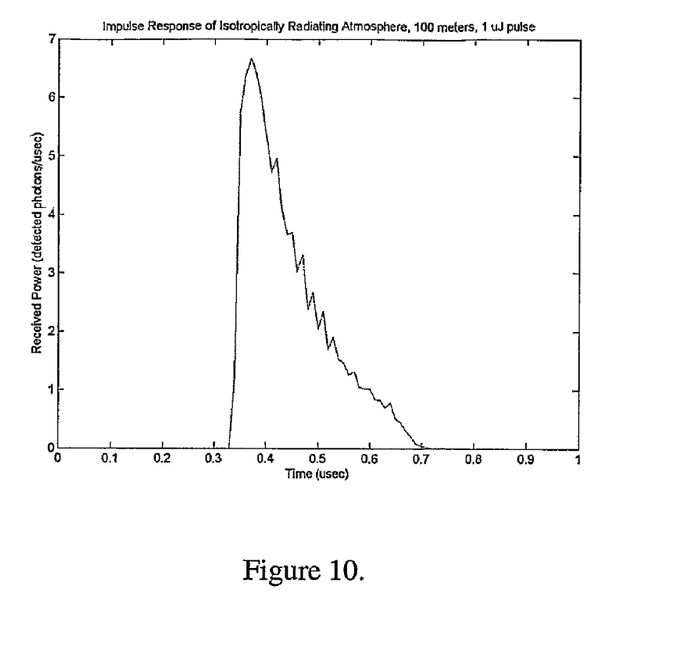
FIG. 10 is a graph showing impulse response of UV NLOS atmospheric scattering channel for 100 meter separation between transmitter and receiver for a preferred embodiment of a non line-of sight communication system of the present invention.
Figure 11:
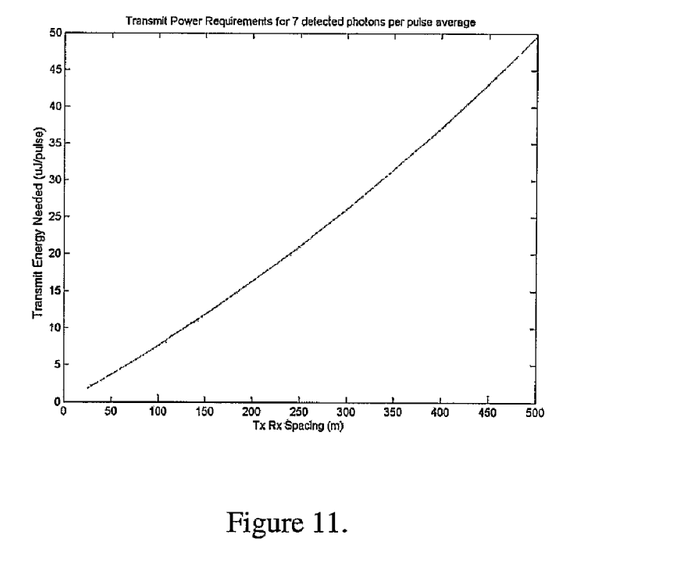
FIG. 11 is a graph showing required transmitted energy per pulse for 7 counted photons per bit average, as a function of transmitter to receiver separation for a preferred embodiment of a non line-of sight communication system of the present invention.

2.2 Radiative Transfer Simulation:

Recent single and double scatter radiative transfer simulations for the system configuration shown in FIG. 8 and operating with a 19.2 kbps data rate, have shown that 7 uJ/pulse is required for an inter-nodal separation of 100 m with an uncorrected bit error rate (BER) of 1E-3. The impulse response was approximately 400 ns as shown in FIG. 10. These results closely agree with published results as shown in M. R. Luettgen, J. H. Shapiro and D. M. Reilly; "Non line-of-sight single-scatter propagation model"; *J. Opt. Soc. Am A*, Vol. 8, No. 12, December 1991, the contents of which are incorporated herein by reference. It was also shown that transmitted energy/pulse requirements grew linearly (not $1/R^2$) with range. A plot of energy/pulse requirements as a function of range is show in FIG. 11.

2.3 LED Based Transmitter Pulse Characteristics:

SUVOS LEDs are ideal candidates to serve as transmitter UV energy sources. In their present state of maturity arrays of LEDs are needed to provide signal levels necessary for 100 meter communication ranges. Fortunately, their development is such that orders of magnitude increases in performance have been witnessed in the past year. This speaks well to FIG. 11 which shows a linear dependence of signal powers as a function of range. Considering the nearly exponential development rate of UV LEDs, a wide variety of communications capabilities will be enabled once the performance threshold is exceeded.

Figure 12:
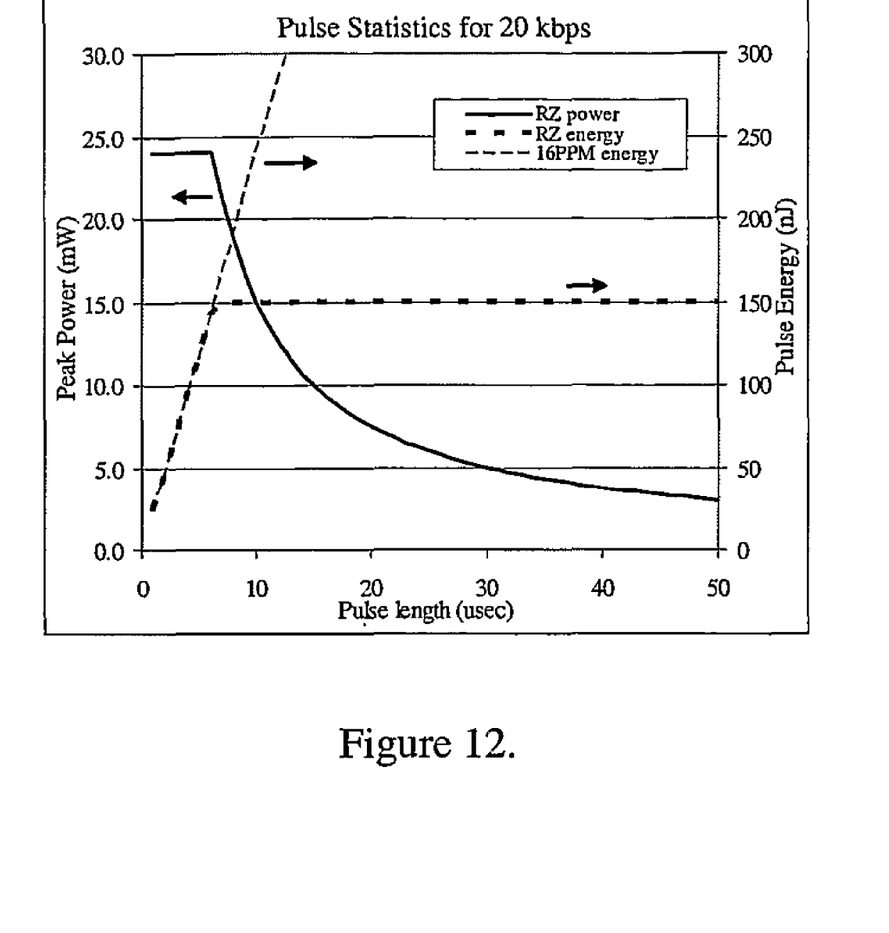
FIG. 12 is a graph showing pulse energy and power as a function of pulse width for 20 kbps considering an average power limit of 1.5 mW and a peak power limit of 24 mW for a preferred embodiment of a non line-of sight communication system of the present invention.

To obtain the maximum energy per pulse, some engineering tradeoffs may be made based on the characteristics of the UV LEDs. The two driving parameters of interest are the average power limit and peak power limit. Devices only capable of low peak powers are best operated at high duty cycles, at their average power limit, to maximize energy per pulse by maximizing pulse width. Devices which are capable of high peak powers can be operated at lower duty cycles and still obtain large pulse energies. FIG. 12 shows plots of pulse power and energy for a 20 kbps data rate. Three plots are shown. The curve labeled "RZ power" shows the peak power as a function of pulse width for a return-to-zero on-off keyed (RZ-OOK) modulation format. Assuming half the data bits are zeros, a 50 usec pulse has a peak power of 3 mW. As the pulse width is reduced, by reducing the duty cycle, the peak power may be increased while maintaining operation at the average power limit. The corresponding energy per pulse, shown by the curve labeled "RZ energy" is constant and equal to the average power limit (1.5 mW) divided by the pulse rate (10 kpps). At a low enough duty cycle, the peak power limit is reached and the pulse energy is then a linear function of pulse width. If the pulse rate is reduced, then longer pulse widths can be used at the peak power limit while not exceeding the average power limit. The result would be higher pulse energies. The curve labeled "16 PPM" shows the case of 16-pulse-position modulation which reduces the pulse rate to 5 kpps, thus allowing peak power operation for twice the duration of RZ-OOK and correspondingly twice the pulse energy of "RZ energy".

Figure 13:
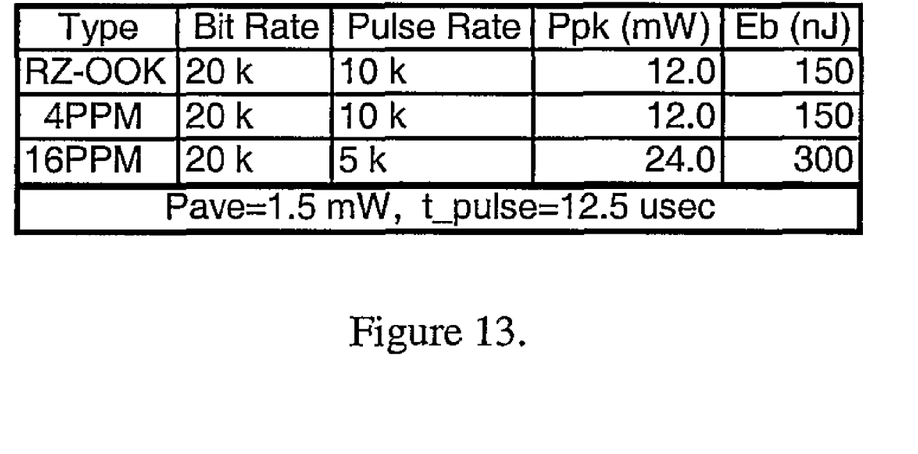
FIG. 13 is a graph showing pulse statistics of three modulation formats each providing 20 kbps data rate for a preferred embodiment of a non line-of sight communication system of the present invention.

2.4 Modulation:

Today's UV LEDs have ratios of peak power limit to average power limit in the range of 16-20. The inverse of this ratio sets the duty cycle at which the LED operation transitions from being average power limited to being peak power limited. A communication system can be designed to operate at both limits such that the maximum energy per pulse is achieved while the maximum bit rate is achieved. Utilizing high order PPM is a means of achieving this optimum. FIG. 13 shows the statistics of three modulation formats with LED operating characteristics similar to that shown in FIG. 12. It is easy to see from the figure that 4 PPM has no energy per bit, Eb, advantage over OOK-RZ; however, there is a significant realizable advantage to using 16 PPM. The energy per bit advantages grow with higher order formats such as 32 PPM, 64 PPM, etc., but with corresponding increases in signal synchronization complexity and increased demands on the LED's ratio of peak to average power limits.

Figure 14:
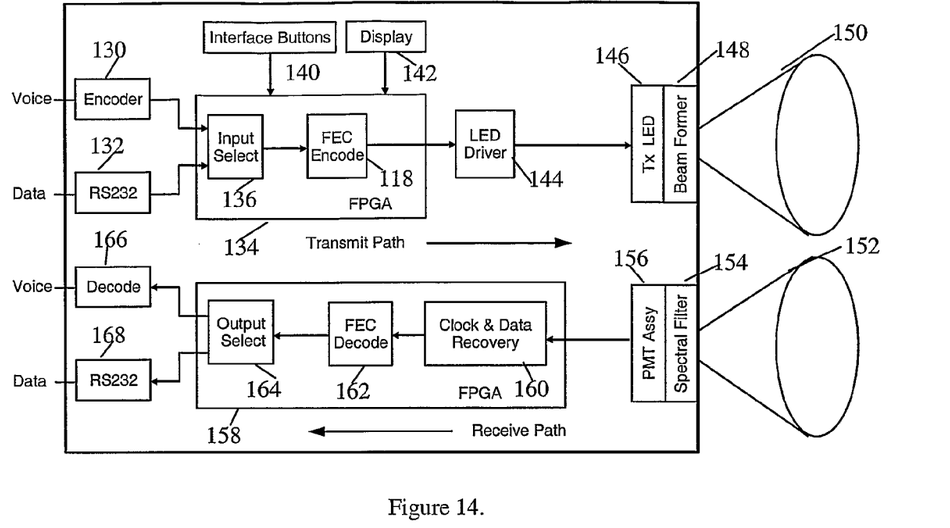
FIG. 14 is a schematic block diagram of a typical UV NLOS transceiver showing the major functions required for a communication link in a preferred embodiment of a non line-of sight communication system of the present invention.

2.5 Transceiver:

FIG. 14 shows one embodiment of a UV NLOS transceiver capable of voice and data communication. The transmit path encodes voice or data with a FEC algorithm and pulses the UV LEDs. A beam former is used to help direct the energy toward the scattering region of interest. The receiver filters away the substantial out-of-band background and sends the signal photon counts to the FEC decoder then to the voice or data outputs. Referring to FIG. 14, a suitable transceiver to be used in the nodes of the network of the present invention would include an encoder 130 for voice communications and an RS232 132 for data which would be inputted into an FPGA 134 including an input select 136, and FEC encoder 138 and with interface buttons 140 and display 142. This FPGA would transmit a signal to an LED driver 144 and then to a Tx LED 146 and beam former 148 to transmit ultra-violet radiation with a wavelength within a solar blind-region in cone 150. On the receive path, ultra-communication within the solar blind region in cone 152 would be received in spectral filter 154 and PMT Assembly 156 which would transmit a signal to FPGA 158 including clock and data recovery 160, FEC decode 162, and output select 164 to either decode 166 for voice or RS232 168 for data.

The unique properties of the solar blind ultraviolet spectral region provide a basis for covert non line-of-sight communication systems with highly desirable characteristics. This type system can provide reliable inter-nodal communication for unattended ground sensor networks and is particularly attractive when non line-of-sight conditions do or may exist between network nodes, covert and low power operation are required, and insensitivity to positioning, ground proximity and meteorological conditions are desired.

Small, low power and low cost transceivers are becoming available as a result of the DARPA SUVOS program. Light emitting diodes (LEDs) being developed under this program are improving at a rapid rate and significant improvements in pulse energy, efficiency and reliability are anticipated. Communication systems based on this technology will provide a non line-of-sight capability with data rates of hundreds of kbps and ranges of hundreds of meters.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for providing communications in an unattended ground sensor network, for use in both line-of-sight (LOS) and non-line-of-sight (NLOS) conditions, the method comprising the steps of:
    transmitting and receiving ultraviolet radiation having a wavelength within the solar blind region, wherein the ultraviolet radiation is transmitted and received from a plurality of unattended ground sensing nodes, and wherein the plurality of unattended ground sensing nodes are arranged both in a LOS network, which communicates via LOS communication, and in a NLOS network, which communicates via NLOS communication;
    transmitting the ultraviolet radiation from the plurality of unattended ground sensing nodes to a gateway node; and
    transmitting the ultraviolet radiation from the gateway node to a remote receiver via LOS communication.

2. The method of claim 1 wherein the ultraviolet energy transmitted from the gateway node is within the solar blind region.

3. The method of claim 1 further comprising:
    causing each of the plurality of unattended ground sensing nodes to transmit ultraviolet radiation via transmitted beams; and
    causing each of the plurality of unattended ground sensing nodes to receive ultraviolet radiation through receiving fields of view.

4. The method of claim 3 further comprising:
    causing a first of the plurality of unattended ground sensing nodes to generate the transmitted beams;
    causing a second of the plurality of unattended ground sensing nodes to receive the transmitted beams;
    placing the second of the plurality of unattended ground sensing nodes within the geometric volume defined by the transmitted beams of the first of the plurality of unattended ground sensing nodes; and
    placing the first of the plurality of unattended ground sensing nodes within the geometric volume defined by the receiving fields of view of the second of the plurality of unattended ground sensing nodes, wherein the transmitted beams and receiving fields of view have an angle that is at most 30°.

5. The method of claim 3 further comprising:
    causing at least one of the transmitted beams, transmitted from at least one of the plurality of unattended ground sensing nodes, to intersect at least one of the receiving fields of view of at least another of the plurality of unattended ground sensing nodes, receiving the at least one of the transmitted beams; and
    causing the at least one of the plurality of unattended ground sensing nodes, transmitting the at least one of the transmitted beams, and the at least another of the plurality of unattended ground sensing nodes, receiving the at least one of the transmitted beams, to lie outside of a geometric volume defined by the at least one of the transmitted beams and the at least one of the receiving fields of view.

6. The method of claim 5 further comprising:
    causing the at least one of the transmitted beams and the at least one of the receiving fields of view each to have a longitudinal axis that is vertical.

7. The method of claim 6 further comprising:
    causing the at least one of the transmitted beams and the at least one of the receiving fields of view to each have angles ranging from about 30° to about 120°.

8. The method of claim 6 further comprising:
    causing the longitudinal axis to intersect a longitudinal axis of another of the transmitted beams and another of the receiving fields of view.

9. The method of claim 8 further comprising:
    causing the at least one of the transmitted beams and the at least one of the receiving fields of view to have an angle ranging from about 30° to about 90°; and
    causing the another of the transmitted beams and the another of the receiving fields of view to have an angle ranging from about 30° to about 90°.

10. The method of claim 1 wherein the ultraviolet radiation has a wavelength ranging from about 200 nm to about 280 nm.

11. The method of claim 1 wherein the ultraviolet radiation is transmitted by means of a light emitting diode (LED).

12. An unattended ground sensor network, capable of operating in both line-of-sight (LOS) and non-line-of-sight (NLOS) conditions, the unattended ground sensor network comprising:
    a plurality of unattended ground sensing nodes which transmit and receive ultraviolet radiation having a wavelength within the solar blind region, wherein the plurality of nodes are arranged both in a LOS network, which communicates via LOS communication, and in a NLOS network, which communicates via NLOS communication; and
    a gateway node that receives the ultraviolet radiation from the plurality of unattended sensing nodes, and wherein the gateway node transmits the ultraviolet radiation from the plurality of unattended ground sensing nodes to a remote receiver, via LOS communication.

13. The unattended ground sensor network of claim 12 wherein the ultraviolet radiation transmitted from the gateway node is within the solar blind region.

14. The unattended ground sensor network of claim 12 wherein each of the plurality of unattended ground sensing nodes transmits ultraviolet radiation via transmitted beams, and wherein each of the plurality of unattended ground sensing nodes receives ultraviolet radiation through receiving fields of view.

15. The unattended ground sensor network of claim 14 wherein at least one of the transmitted beams, transmitted from at least one of the plurality of unattended ground sensing nodes, intersects at least one of the receiving fields of view of at least another of the plurality of unattended ground sensing nodes, receiving the one of the transmitted beams; and the at least one of the plurality of unattended ground sensing nodes transmitting the at least one of the transmitted beams and the at least another of the plurality of unattended ground sensing nodes receiving the at least one of the transmitted beams lie outside of a geometric volume defined by the at least one of the transmitted beams and the at least one of the receiving fields of view.

16. The unattended ground sensor network of claim 14 wherein a first of the plurality of unattended ground sensing nodes generates the transmitted beams and a second of the plurality of unattended ground sensing nodes receives the transmitted beams, and wherein the second of the plurality of unattended ground sensing nodes lies within the geometric volume defined by the transmitted beams of the first of the plurality of unattended ground sensing nodes, and the first of the plurality of unattended ground sensing nodes lies within the geometric volume defined by the receiving fields of view of the second of the plurality of unattended ground sensing nodes, the transmitted beams and receiving fields of view having an angle that is at most 30°.

17. The unattended ground sensor network of claim 15 wherein the at least one of the transmitted beams and the at least one of the receiving fields of view each have a longitudinal axis that is vertical.

18. The unattended ground sensor network of claim 17 wherein the at least one of the transmitted beams and the at least one of the receiving fields of view each have angles ranging from about 30° to about 120°.

19. The unattended ground sensor network of claim 17 wherein the longitudinal axis intersects a longitudinal axis of another of the transmitted beams and another of the receiving fields of view.

20. The unattended ground sensor network of claim 19 wherein the at least one of the transmitted beams and the at least one of the receiving fields of view have an angle ranging from about 30° to about 90°, and the another of the transmitted beams and the another of the receiving fields of view have an angle ranging from about 30° to about 90°.

21. The unattended ground sensor network of claim 12 wherein the ultraviolet radiation has a wavelength ranging from about 200 nm to about 280 nm.

22. The unattended ground sensor network of claim 12 wherein the ultraviolet radiation is transmitted by means of a light emitting diode (LED).

23. A method for providing communications in an unattended ground sensor network, for use in both line-of-sight (LOS) and non-line-of-sight (NLOS) conditions, the method comprising the steps of:
transmitting and receiving internodal ultraviolet radiation having a wavelength within the solar blind region, the wavelength ranging from about 200 nm to about 249 nm, wherein the internodal ultraviolet radiation is transmitted and received from a plurality of unattended ground sensing nodes, and the plurality of unattended ground sensing nodes are arranged both in a LOS network, which communicates via LOS communication, and in a NLOS network, which communicates via NLOS communication;
transmitting the internodal ultraviolet radiation from the plurality of unattended ground sensing nodes to a gateway node; and
transmitting the internodal ultraviolet radiation via a gateway ultraviolet radiation from a gateway node to a remote receiver, via LOS communication, wherein the gateway ultraviolet radiation has a wavelength ranging from about 200 nm to about 280 nm.

24. The method of claim 23 further comprising:
causing each of the plurality of unattended ground sensing nodes to transmit ultraviolet radiation via transmitted beams; and
causing each of the plurality of unattended ground sensing nodes to receive ultraviolet radiation through receiving fields of view.

25. The method of claim 24 further comprising:
causing a first of the plurality of unattended ground sensing nodes to generate the transmitted beams;
causing a second of the plurality of unattended ground sensing nodes to receive the transmitted beams;
placing the second of the plurality of unattended ground sensing nodes within the geometric volume defined by the transmitted beams of the first of the plurality of unattended ground sensing nodes; and
placing the first of the plurality of unattended ground sensing nodes within the geometric volume defined by the receiving fields of view of the second of the plurality of unattended ground sensing nodes, wherein the transmitted beams and receiving fields of view have an angle that is at most 30°.

26. The method of claim 24 further comprising:
causing at least one of the transmitted beams, transmitted from at least one of the plurality of unattended ground sensing nodes, to intersect at least one of the receiving fields of view of at least another of the plurality of unattended ground sensing nodes, receiving the one of the transmitted beams; and
causing the at least one of the plurality of unattended ground sensing nodes transmitting the at least one of the transmitted beams and the at least another of the plurality of unattended ground sensing nodes receiving the at least one of the transmitted beams to lie outside of a geometric volume defined by the at least one of the transmitted beams and the at least one of the receiving fields of view.

27. The method of claim 26 further comprising:
causing the at least one of the transmitted beams and the at least one of the receiving fields of view each to have a longitudinal axis that is vertical.

28. The method of claim 27 further comprising:
causing the at least one of the transmitted beams and the at least one of the receiving fields of view to each have angles ranging from about 30° to about 120°.

29. The method of claim 27 further comprising:
causing the longitudinal axis to intersect a longitudinal axis of another of the transmitted earns and another of the receiving fields of view.

30. The method of claim 29 further comprising:
causing the at least one of the transmitted beams and the at least one of receiving fields of view to have an angle ranging from about 30° to about 90°; and
causing the another of the transmitted beams and the another of the receiving fields of view to have an angle ranging from about 30° to about 90°.

31. The method of claim 23 wherein the ultraviolet radiation is transmitted by means of a light emitting diode (LED).

32. An unattended ground sensor network capable of operating in both line-of-sight (LOS) and non-line-of-sight (NLOS) conditions, the unattended ground sensor network comprising:
a plurality of unattended ground sensing nodes which transmit and receive internodal ultraviolet radiation having a wavelength within the solar blind region, the wavelength ranging from about 200 nm to about 249 nm, wherein the plurality of unattended ground sensing nodes are arranged in both a LOS network, which communicates via LOS communication, and in a NLOS network, which communicates via NLOS communication; and
a gateway node that receives the internodal ultraviolet radiation from the plurality of unattended ground sensing nodes, and wherein the gateway node transmits the internodal ultraviolet radiation via gateway ultraviolet radiation, to a remote receiver via LOS communication, the gateway ultraviolet radiation having a wavelength ranging from about 200 nm to about 280 nm.

33. The unattended ground sensor network of claim 32 wherein each of the plurality of unattended ground sensing nodes transmits ultraviolet radiation via transmitted beams, and wherein each of the plurality of unattended ground sensing nodes receives ultraviolet radiation through receiving fields of view.

34. The unattended ground sensor network of claim 33 wherein a first of the plurality of unattended ground sensing nodes generates the transmitted beams and a second of the plurality of unattended ground sensing nodes receives the transmitted beams, and wherein the second of the plurality of unattended ground sensing nodes lies within the geometric volume defined by the transmitted beams of the first of the plurality of unattended ground sensing nodes, and the first of the plurality of unattended ground sensing nodes lies within the geometric volume defined by the receiving fields of view of the second of the plurality of unattended ground sensing nodes, and wherein the transmitted beams and receiving fields of view have an angle that is at most 30°.

35. The unattended ground sensor network of claim 33 wherein at least one of the transmitted beams, transmitted from at least one of the plurality of unattended ground sensing nodes, intersects at least one of the receiving fields of view of at least another of the plurality of unattended ground sensing nodes receiving the at least one of the transmitted beams; and the at least one of the plurality of unattended ground sensing nodes, transmitting the at least one of the transmitted beams, and the at least another of the plurality of unattended ground sensing nodes, receiving the at least one of the transmitted beams, lie outside of a geometric volume defined by the at least one of the transmitted beams and the at least one of the receiving fields of view.

36. The unattended ground sensor network of claim 35 wherein the at least one of the transmitted beams and the at least one of the receiving fields of view each have a longitudinal axis that is vertical.

37. The unattended ground sensor network of claim 36 wherein the at least one of the transmitted beams and the at least one of the receiving fields of view each have angles ranging from about 30° to about 120°.

38. The unattended ground sensor network of claim 36 wherein the longitudinal axis intersects a longitudinal axis of another of the transmitted beams and another of the receiving fields of view.

39. The unattended ground sensor network of claim 38 wherein the at least one of the transmitted beams and the at least one of the receiving fields of view have an angle ranging from about 30° to about 90°, and the another of the transmitted beams and the another of the receiving fields of view have an angle ranging from about 30° to about 90°.

40. The unattended ground sensor network of claim 32 wherein the ultraviolet energy transmitted from the gateway node within the solar blind region.

41. The unattended ground sensor network of claim 32 wherein the ultraviolet radiation is transmitted by means of a light emitting diode (LED).

* * * * *